(12) United States Patent
Orino et al.

(10) Patent No.: US 6,650,450 B1
(45) Date of Patent: Nov. 18, 2003

(54) LIGHT TRANSMITTING AND RECEIVING DEVICE HAVING OPTICAL MEMBER WITH BEAM SPLITTER

(75) Inventors: Kanjo Orino, Tokyo (JP); Shigeru Oshima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/064,081

(22) Filed: Apr. 22, 1998

(30) Foreign Application Priority Data

Apr. 30, 1997 (JP) .............................. 9-126339

(51) Int. Cl.[7] .................. H04B 10/00; H04J 14/02
(52) U.S. Cl. .................. 359/154; 359/159; 359/129
(58) Field of Search .................. 359/152, 153, 359/156, 159

(56) References Cited

U.S. PATENT DOCUMENTS

| | | | |
|---|---|---|---|
| 4,199,226 A | 4/1980 | Weber et al. ............. | 350/157 |
| 5,162,944 A | * 11/1992 | Yamamoto et al. ......... | 359/247 |
| 5,251,068 A | 10/1993 | Oshima et al. ........... | 359/634 |
| 5,530,577 A | * 6/1996 | Orino et al. ............. | 359/152 |
| 5,594,580 A | * 1/1997 | Sakanaka et al. ......... | 359/172 |
| 5,627,669 A | * 5/1997 | Orino et al. ............. | 359/156 |
| 5,689,354 A | * 11/1997 | Orino .................... | 359/172 |

FOREIGN PATENT DOCUMENTS

JP 5-134207 5/1993

* cited by examiner

Primary Examiner—Leslie Pascal
Assistant Examiner—Dalzid Singh
(74) Attorney, Agent, or Firm—Fitzpatrick, Cella, Harper & Scinto

(57) ABSTRACT

A light transmitting and receiving device including a light projecting unit having an optical axis of projection, a light receiving unit having an optical axis of reception, and an optical member, disposed where the optical axis of projection intersects the optical axis of reception, including therewithin a light beam splitter which reflects one of the light beam of the light projecting unit and the light beam of the light receiving unit while transmitting therethrough the other of the light beam of the light projecting unit and the light beam of the light receiving unit, and having a transmission surface from which the light beam of the light projecting unit is transmitted and a surface opposing the transmission surface, wherein the transmission surface and the opposing surface are mutually in parallel and are inclined to the principal ray of the transmitted light beam from the transmission surface.

48 Claims, 12 Drawing Sheets

LIGHT TRANSMITTING AND RECEIVING DEVICE HAVING OPTICAL MEMBER WITH BEAM SPLITTER

BACKGROUND OF THE INVENTION

1. Field of the Invention

The present invention relates to a light transmitting and receiving device and, in particular, to the one suitable for performing two-way optical communication by transmitting and receiving light beams in the outdoor atmosphere as a transmission medium.

2. Description of the Related Art

A variety of light transmitting and receiving devices for transmitting and receiving optical beams through the outdoor atmosphere as a transmission medium have been proposed.

In the optical communication system disclosed in Japanese Patent Laid-Open No. 5-134207, two identically constructed optical communication devices installed facing each other with a distance allowed therebetween perform two-way optical communication.

FIG. 24 shows a major portion of one conventional optical communication device. This optical communication device comprises light projecting means having a light emitting device 101 for generating a signal light and a positive-powered projection lens 102, light receiving means having a light receiving device 103 for receiving a signal light and a positive-powered light receiving lens 104, a polarizing beam splitter 105 which reflects a projected light beam while receiving a received light beam, and a beam expander 106 which expands a projected light beam LA while converging a received light beam LB. The beam expander 106 has a negative-powered lens unit 107 and a positive-powered lens unit 108.

The polarizing beam splitter 105 is located where the optical axes of the light projection lens 102 and the light receiving lens 104 intersect each other, and the beam expander 106 is arranged to the transmission side of the polarizing beam splitter 105 for the projected light beam.

A laser diode is used for the light emitting device 101 for generating the signal light, and the polarizing beam splitter 105 is a rectangularly parallelopipedal or cubic polarizing beam splitter having a beam splitting surface 105a of a deposited dielectric multilayer which reflects most of the s-polarized light beam while transmitting most of the p-polarized light beam.

To achieve efficient light transmission and reception using the polarizing beam splitter 105, a light beam LB received from an opposing light transmitting and receiving device B (not shown) is designed to be p-polarized when a transmitted light LA from the light transmitting and receiving device A shown in FIG. 24 is s-polarized.

The s-polarized light beam of the light beam emitted from the light emitting device 101 for generating the signal light becomes a substantially parallel light beam, is mostly reflected by the beam splitting surface 105a of the polarizing beam splitter 105, and is transmitted as the transmitted light beam LA from the light transmitting and receiving device A to the light transmitting and receiving device B.

The (p-polarized) light beam projected by the light transmitting and receiving device B is incident on the light transmitting and receiving device A as the received light beam LB, and is mostly transmitted through the beam splitting surface 105a of the polarizing beam splitter 105, and reaches the light receiving device 103 for detecting the signal light.

Two-way optical communication is performed for light transmission and reception in this way in the above system.

In the optical communication device constructed as shown in FIG. 24, the light beam projected from the light projection lens 102 is substantially vertically incident, in the form of a substantially parallel light beam, on a transmission and reception surface 109 of the polarizing beam splitter 105. For this reason, a light beam 110 reflected from the transmission and reception surface 109, out of the projected light beam, is introduced in whole (i.e., in its entirety) in an effective light receiving surface of the light receiving device 103 as noise light.

This noise light is now referred to as a first noise light. As shown in FIG. 25, the light beam 112 transmitted through the beam splitting surface 105a reaches and is reflected by a surface 111 shown as a top surface, is reflected from the beam splitting surface 109a, travels to the light receiving lens 104, and is introduced in whole in the effective light receiving surface of the light receiving device 103 for signal light detection as noise light. This noise light is here referred to as a second noise light.

The first and second noise light rays are the cause for a so-called cross-talk, and degrade the accuracy of optical communication. To cope with the second noise light, the surface 111 is conventionally subjected to antireflection process by grinding and then applying a black coating thereon. To cope with the first noise light, the only available antireflection process is applying an antireflection coating onto the transmission and reception surface 109. The anti-reflection coating cannot reduce reflectance to zero and cross-talk still persists.

Simply tilting the polarizing beam splitter 105 of the conventional structure cannot improve the situation in which two noise light rays return to the light receiving lens 104. If an attempt is made to tilt only the transmission and reception surface 109 of the polarizing beam splitter 105, the optical axis of projection and the optical axis of reception fail to intersect each other at a right angle, and in such a case, particular consideration needs to be given to the design of a lens barrel, requiring a complex component design.

SUMMARY OF THE INVENTION

It is an object of the present invention to provide a light transmitting and receiving device for use as an optical communication device for accurate optical communication in which at least first noise light or second noise light is efficiently prevented from entering a light receiving element by setting up the appropriate form of a polarizing beam splitter through which transmission and reception of beams are performed for two-way optical communication.

Accordingly, in one aspect, the light transmitting and receiving device of this invention, through the polarizing beam splitter of a transparent body including a beam splitting surface therewithin, projects a light beam from light projecting means in a predetermined direction and receives a light beam in the predetermined direction at light receiving means, wherein the polarizing beam splitter is designed such that a light beam reflected from one of the surfaces constituting the polarizing beam splitter, out of the light beam from the light projecting means, is introduced into the light receiving means via the beam splitting surface at an inclination with respect to the optical axis of the light receiving means.

More particularly, the light transmitting and receiving device of the present invention preferably comprises a light projecting unit having an optical axis of projection, a light receiving unit having an optical axis of reception, and an optical member, disposed where the optical axis of projection intersects the optical axis of reception, including therewithin a light beam splitter which reflects one of the light beam of the light projecting unit and the light beam of the light receiving unit while transmitting therethrough the other of the light beam of the light projecting unit and the light beam of the light receiving unit, and having a transmission surface from which the light beam of the light projecting unit is transmitted and a surface opposing the transmission surface, wherein the transmission surface and the opposing surface are mutually in parallel and are inclined to the principal ray of the transmitted light beam from the transmission surface.

In the light transmitting and receiving device, the light projecting unit preferably comprises a light source for emitting a polarized light beam, and the beam splitter is a polarizing beam splitter.

Preferably, the optical axis of projection and the optical axis of reception are perpendicular to each other.

Preferably, the optical member has an entrance surface on which the light beam from the light projecting unit is incident and a surface opposing the entrance surface, and either the entrance surface or the opposing surface is parallelogrammatic in shape.

Preferably, the optical member has an entrance surface on which the light beam from the light projecting unit is incident and a surface opposing the entrance surface, and either the entrance surface or the opposing surface is rhombic (i.e., in the shape of a rhombus) in shape.

Preferably, the transmission surface of the optical member is rectangular in shape.

Preferably, the transmission surface of the optical member is square in shape.

Preferably, the optical member has a side surface in parallel with the plane in which both the optical axis of reception and the optical axis of projection lie, and the side surface is parallelogrammatic in shape.

Preferably, the optical member has a side surface in parallel with the plane in which both the optical axis of reception and the optical axis of projection lie, and the side surface is of a rhombus in shape.

Preferably, the transmission surface of the optical member is rectangular in shape.

Preferably, the transmission surface of the optical member is square in shape.

In view of the foregoing, in one aspect, the present invention relates to a light transmitting and receiving device comprising (a) a light projecting unit having an optical axis of projection; (b) a light receiving unit having an optical axis of reception; and (c) an optical member, disposed where the optical axis of projection intersects the optical axis of reception, the optical member including therewithin a light beam splitter which reflects one of a light beam from the light projecting unit and a light beam travelling to the light receiving unit while transmitting therethrough the other of the light beam from the light projecting unit and the light beam travelling to the light receiving unit, wherein the optical member has a transmission surface from which the light beam from the light projecting unit is transmitted and a surface opposing the transmission surface, wherein the transmission surface and the opposing surface are mutually in parallel and are inclined with respect to the principal ray of the transmitted light beam from the transmission surface.

In another aspect, the present invention relates to an optical member for use with a light transmitting and receiving apparatus, the apparatus having (a) light transmitting means for transmitting light, the light transmitting means having an optical axis of projection, and (b) light receiving means for receiving light, the light receiving means having an optical axis of reception, wherein the optical member is disposed where the optical axis of projection and the optical axis of reception intersect, the optical member comprising (a) a top surface; (b) a bottom surface opposing and parallel to the top surface; (c) a light entrance surface for receiving light from the light transmitting means; (d) a side surface opposing and parallel to the light entrance surface; (e) a light transmission and reception surface extending between the light entrance surface and the side surface; (f) a light exit surface opposing and parallel to the light transmission and reception surface; and (g) a polarizing light beam splitting surface inside the optical member, wherein each of the top surface, the bottom surface, the light entrance surface, the side surface, the light transmission and reception surface, and the light exit surface is an exterior surface of the optical member, wherein light from the light projecting means enters the light entrance surface, is reflected by the polarizing light beam splitting surface, and exits from the optical member through the light transmission and reception surface, while incoming light passes through the light transmission and reception surface, is transmitted through the polarizing light beam splitting surface, and exits through the light exit surface to the light receiving means, and wherein the central beam of the light exiting through the light transmission and reception surface is inclined with respect to a line normal to the light transmission and reception surface. Preferably, the optical member is a polarizing beam splitter, most preferably one which has a surface that reflects light having one polarization while transmitting therethrough light having a different polarization.

These and other aspects, objects, advantages, and features of the present invention will become apparent from the following detailed description of preferred embodiments thereof taken in connection with the accompanying drawings.

DESCRIPTION OF THE PREFERRED EMBODIMENTS

Figure 1A:
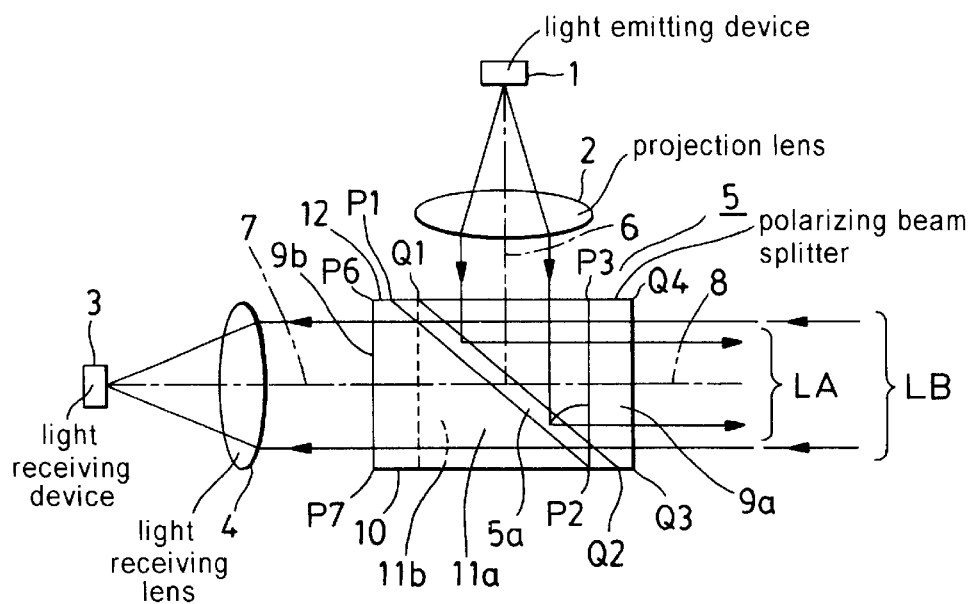
FIG. 1A is a plan view showing a major portion of a first embodiment of the present invention.
Figure 2:
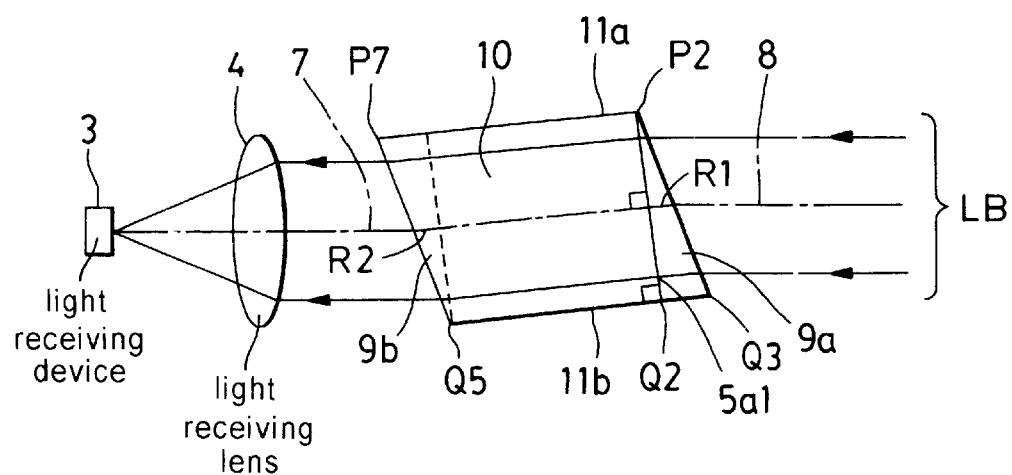
FIG. 2 partly shows the first embodiment of FIG. 1A.
Figure 3:
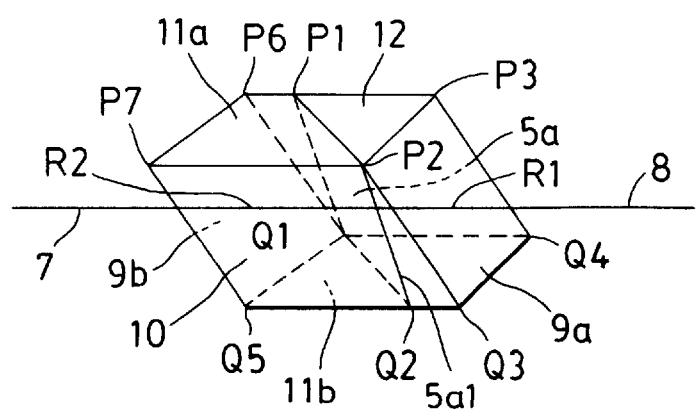
FIG. 3 shows the beam splitter of the first embodiment of FIG. 1A.
Figure 4:
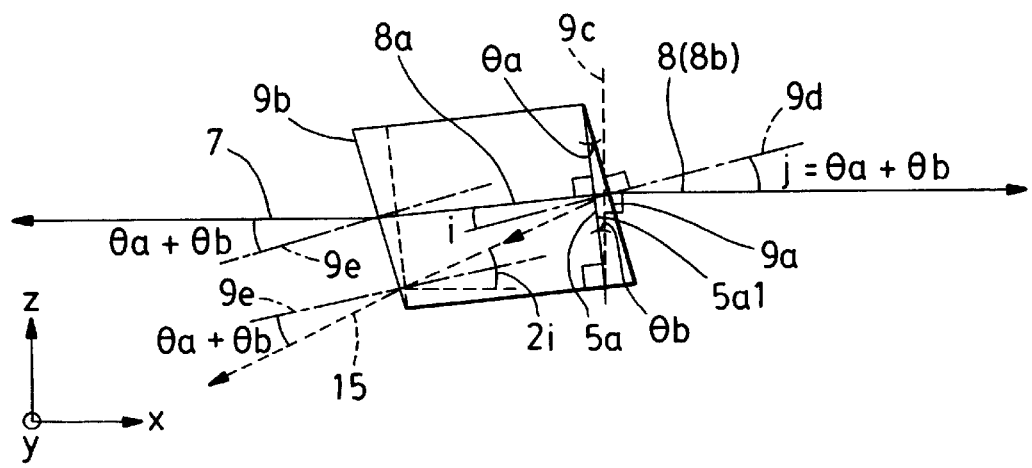
FIG. 4 shows the beam splitter of the first embodiment of FIG. 1A.

FIG. 1A is a plan view showing a major portion of a first embodiment of the present invention, and FIGS. 2 through 4 are respectively explanatory views partly showing the first embodiment shown in FIG. 1A.

The light transmitting and receiving device of this embodiment is applied for use as light transmitting and receiving devices that are used in a two-way optical communication system in which the mutually facing devices are spaced apart to transmit and receive light beams in two-way communication.

A polarizing beam splitter 5 of this embodiment precludes cross-talk by guiding a light beam, reflected from a transmission and reception surface 9a, outside the effective reception area of a light receiving device 3.

Shown in FIG. 1A are light projecting means (a light projecting optical system) having a light emitting device 1 for generating a signal light and a positive-powered projection lens (a first lens unit) 2, and light receiving means (a light receiving optical system) having a light receiving device 3 for receiving a signal light and a positive-powered light receiving lens (a second lens unit) 4. The optical axis (in the air) 6 of the projection lens 2 is made perpendicular to the optical axis (in the air) 7 of the light receiving lens 4, and the polarizing beam splitter 5 having the shape shown in FIG. 3 is located at the intersection of both axes (i.e., the optical axes 6 and 7 intersect within the polarizing beam splitter 5).

A laser diode is used for the light emitting device 1 for generating the signal light and a PIN (positive-intrinsic-negative) photodiode is used for the light receiving device 3 for detecting the signal light.

Each of the light projection lens 2 and light receiving lens 4 is constructed of a single focal length lens or a zoom lens. The polarizing beam splitter 5 is a quadrangular prism having a light entrance surface 12 and side surface 10, both being parallelogrammatic, and a top surface 11a and a bottom surface 11b, both being square or rectangular as shown in FIG. 3. The polarizing beam splitter 5 also has a transmission and reception surface 9a and a light exit surface 9b, and, within polarizing beam splitter 5, a polarizing beam splitting surface 5a.

In particular, reference numerals Q1, Q3, Q4, Q5, P2, P3, P6, and P7 represent the apexes of the polarizing beam splitter 5, while reference numerals P1, Q1, Q2, and P2 represent the apexes of the polarizing beam splitting surface 5a.

Referring to FIG. 4, the transmission and reception surface 9a is inclined with respect to the polarizing beam splitting surface 5a by an angle of θa, and the polarizing beam splitting surface 5a is inclined by an angle of θb with respect to a plane 9c vertical (i.e., perpendicular) to the optical axis 8 of transmission and reception.

In this embodiment, the light beam from the light emitting device 1 is condensed through the projection lens 2 (and introduced through the light entrance surface 12), and the p-polarized light beam of the linearly polarized light is reflected through the polarizing beam splitting surface 5a, and is transmitted in a predetermined direction through the transmission and reception surface 9a. An s-polarized light beam coming in from the predetermined direction passes through the transmission and reception surface 9a, polarizing beam splitting surface 5a and, light exit surface 9b, and is condensed through the light receiving lens 4 on the surface of the light receiving device 3. The transmission and reception of the light beam is performed in this way. In FIG. 2, R1 and R2 indicate the points where the optical axis 8 crosses the transmission and reception surface 9 and the light exit surface 9b, respectively.

As seen from the plan view in FIG. 1A, the polarizing beam splitter 5 in this embodiment is arranged such that its polarizing beam splitting surface 5a is inclined at 45° with respect to each of the optical axis 6 of the projection lens 2 and the optical axis 7 of the light receiving lens 4. As seen from side views of this embodiment in FIGS. 2 and 4, the polarizing beam splitter 5, with its side surface directed toward the reader as shown, is arranged such that an angle j which the normal 9d of the transmission and reception surface 9a makes with respect to the transmission and reception axis 8 is θa+θb.

The central beam of light 8a, which is reflected from the polarizing beam splitting surface 5a on the optical axis 6 and travels toward the transmission and reception surface 9a on the optical axis 8, is referred to as the principal light beam of projected light.

As understood from FIG. 4, the following equation (1) holds true in connection with an angle of incidence i and an angle of exit j of the projected light beam 8a with respect to the normal 9d of the transmission and reception surface 9a. (In other words, as can be seen from FIG. 4, the principal light beam 8a of the projected light passes through and exits from the transmission and reception surface 9a as principal light beam or ray 8b along the optical axis 8.)

$$i+\theta b=j=\theta a+\theta b \qquad (1)$$

therefore, $$i=\theta a \qquad (2)$$

Let n represent the refractive index of the optical material of the polarizing beam splitter 5, and the following equation (3) will be derived from the law of refraction.

$$n \cdot \sin(i) = \sin(j) = \sin(\theta a + \theta b) \quad (3)$$

therefore, $$n \cdot \sin(\theta a) = \sin(\theta a + \theta b) \quad (4)$$

The polarizing beam splitter 5 is located where the optical axis 6 of the projection lens 2 intersects the optical axis 7 of the light receiving lens 4 at a right angle in the positional relationship shown in FIGS. 1 and 2. With equation (4) holding true, the principal light beam 15 (where the principal light beam 15 represents the central beam of light reflected from the transmission and reception surface 9a) is inclined at the angle of i with respect to the normal 9e of the light exit surface 9b into the side opposite to the side of the optical axis 7 of the light receiving lens 4 when the principal light beam 15 of the light reflected from the transmission and reception surface 9a is introduced into the light exit surface (opposing surface) 9b that is in parallel with the surface 9a as shown in FIG. 4. More particularly, the principal light beam 15 of the light reflected from the transmission and reception surface 9a, out of the projected light beam, exits toward the light receiving lens 4 at an angle of 2(θa+θb) with respect to the optical axis 7 of the light receiving lens 4.

Let f represent the focal length of the light receiving lens 4 and Φ represent the diameter of the effective entrance area (i.e., light-sensitive area) of the light receiving device 3, and if the following equation (15) holds true, the principal light beam 15 reflected from the transmission and reception surface 9a, of the projected light beam, is guided off the effective entrance surface (i.e., light-sensitive surface) of the light receiving device 3 for detecting the signal light.

$$f \cdot \tan\{2(\theta a + \theta b)\} > \Phi/2 \quad (5)$$

When f=25 mm and Φ=1 mm, for example, equation (5) is reduced as follows:

$$\theta a + \theta b > 0.57° \quad (6)$$

If an optical material having n=1.76 is selected with θa=0.5°, equation (4) is $$1.76 \cdot \sin(1°) = \sin(0.5° + \theta b)$$

therefore, θb=1.26°.

θa=0.5° and θb=1.26° satisfy equation (6), namely, equation (5).

More particularly, when the polarizing beam splitter having the angle θa between the transmission and reception surface 9a and the polarizing beam splitting surface 5a set to 0.5° is arranged such that the angle (θa+θb) between the transmission and reception surface 9a and a plane 9c vertical to the transmission and reception axis 8 is 1.76°, if viewed from the parallelogrammatic side surface 10, the light beam reflected from the transmission and reception surface 9a of the polarizing beam splitter 5, out of the projected light beam from the light emitting device 1 for generating the signal light, is not received by the light receiving device 3 for detecting the signal light, and the cross-talk attributed to the reflection from the transmission and reception surface 9a of the polarizing beam splitter 5 is thus precluded.

Figure 5:
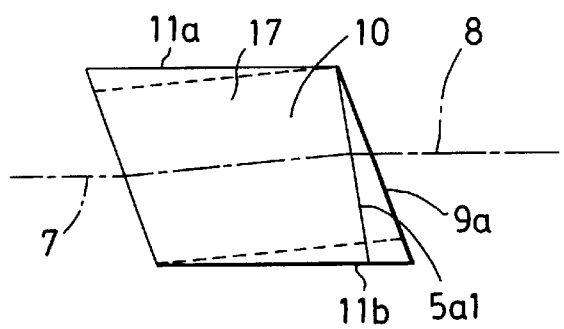
FIG. 5 shows another beam splitter of the first embodiment of FIG. 1A.

In the polarizing beam splitter 5 employed in this embodiment, the outline 5a1 of the polarizing beam splitting surface 5a (where the polarizing beam splitting surface 5a meets the side surface 10) is vertical to both a top surface 11a and a bottom surface 11b extended in parallel planes between which the transmission and reception surface 9a is defined, when viewed from the parallelogrammatic side surface 10 shown in FIG. 2. Referring to the side view of another, alternative polarizing beam splitter 17 of this embodiment in FIG. 5, the top surface 11a and bottom surface 11b extended in parallel planes that define, from top and bottom, the transmission and reception surface 9a, run in parallel with the optical axis 7 of the light receiving lens 4 and the optical axis 8 of transmission and reception. With such an arrangement, a simple design is implemented.

Figure 6:
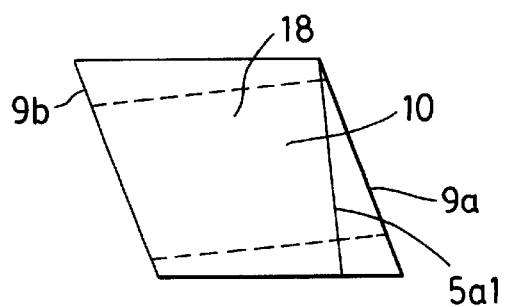
FIG. 6 shows another beam splitter of the first embodiment of FIG. 1A.

FIG. 6 shows the side view of another, alternative polarizing beam splitter 18, in which the side surface 10 is in the shape of a rhombus.

In the first embodiment, of the light beam from the projection lens 2, a light beam transmitted through the polarizing beam splitting surface 5a, reflected from the side surface 10, reflected from the polarizing beam splitting surface 5a, and then introduced into the light receiving device 3 is reduced in light quantity through an antireflection process applied to the side surface 10. The effect of the reflected light beam is thus alleviated.

In the first embodiment, fully satisfying the condition defined by equation (4) is not necessary. If the condition defined by the following equation is satisfied, the purpose of this embodiment is achieved.

$$0.9 < \{n \cdot \sin(\theta a)\}/\{\sin(\theta a + \theta b)\} < 1.1 \quad (4a)$$

Figure 1B:
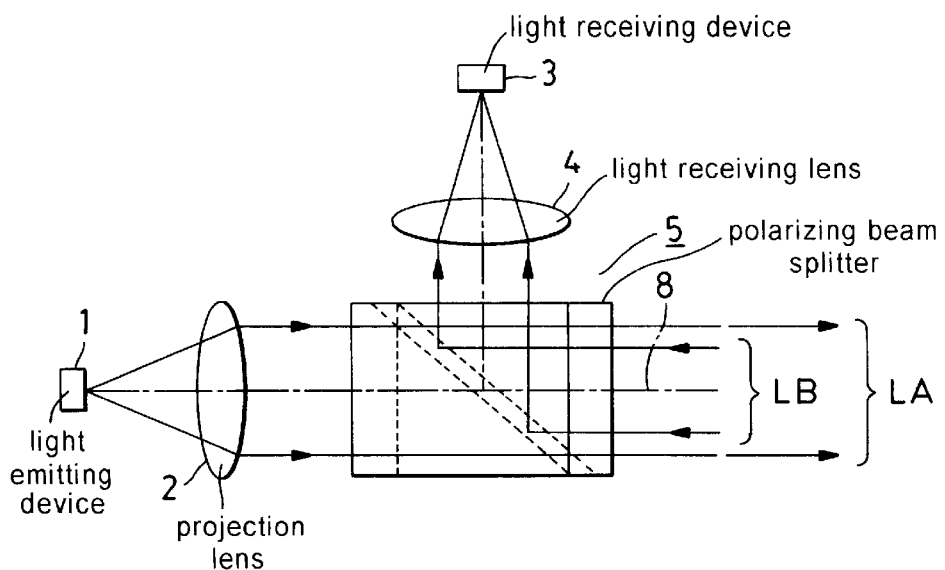
FIG. 1B is a view similar to that in FIG. 1A, with the roles of light projecting means and light receiving means substituted by each other.

If the light projecting means takes the place of the light receiving means and the light receiving means takes the place of the light projecting means in the above arrangement, as shown in FIG. 1B the same advantage will be provided. The same is true of the following embodiments.

Figure 7:
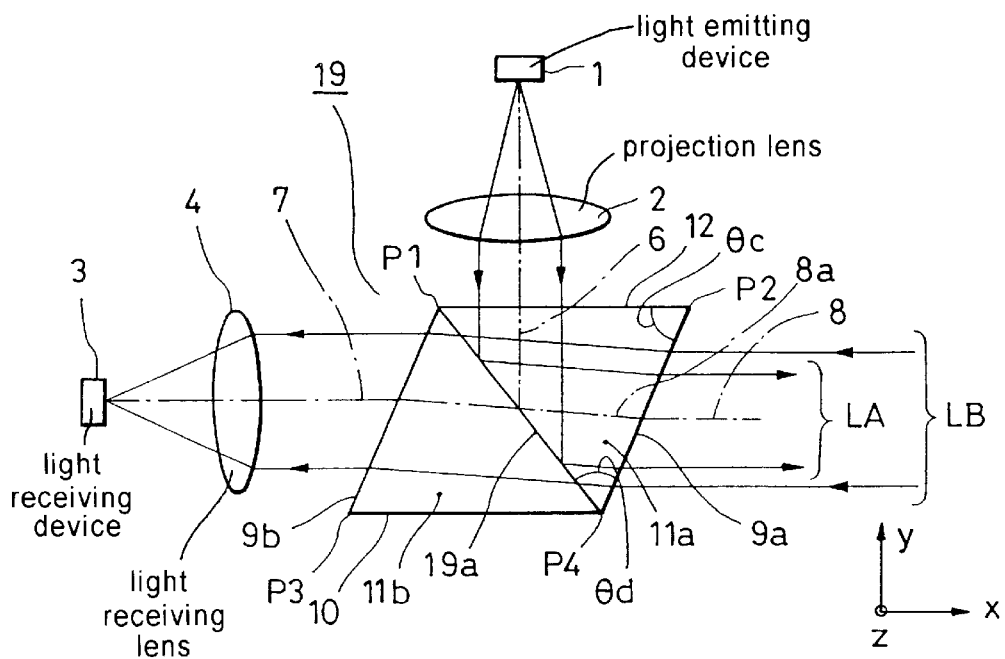
FIG. 7 is a plan view showing a major portion of a second embodiment of the present invention.
Figure 8:
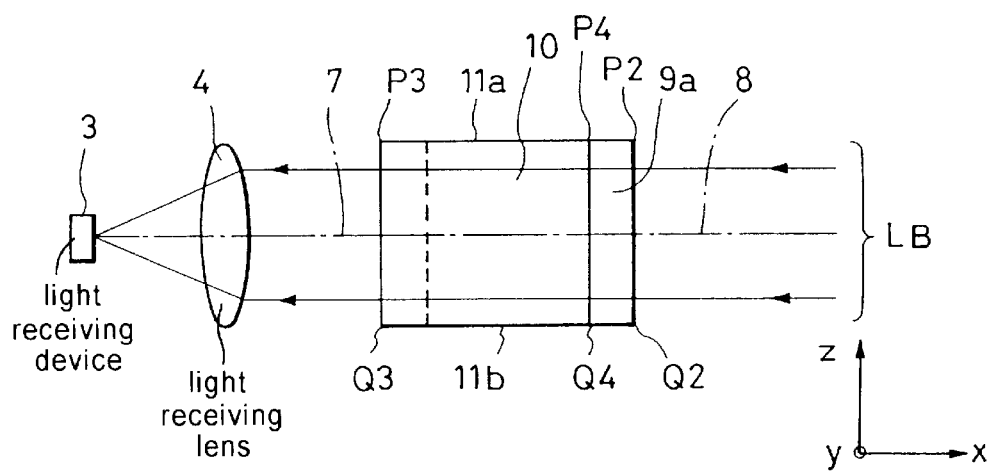
FIG. 8 partly shows the second embodiment of FIG. 7.
Figure 9:
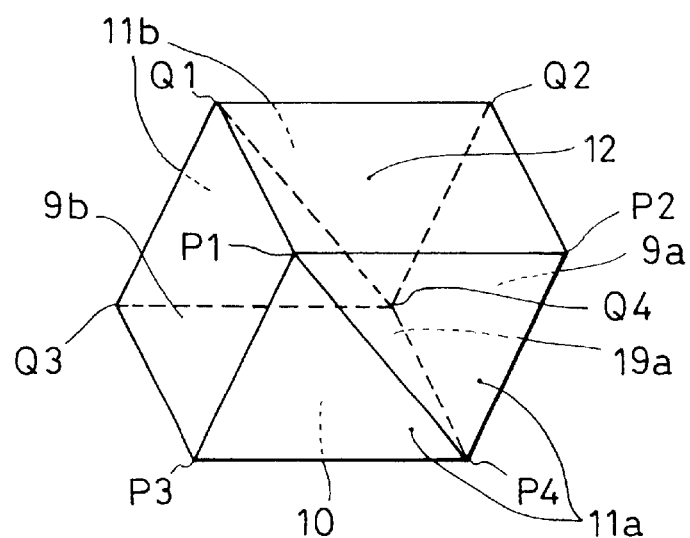
FIG. 9 shows the beam splitter of the second embodiment of FIG. 7.
Figure 10:
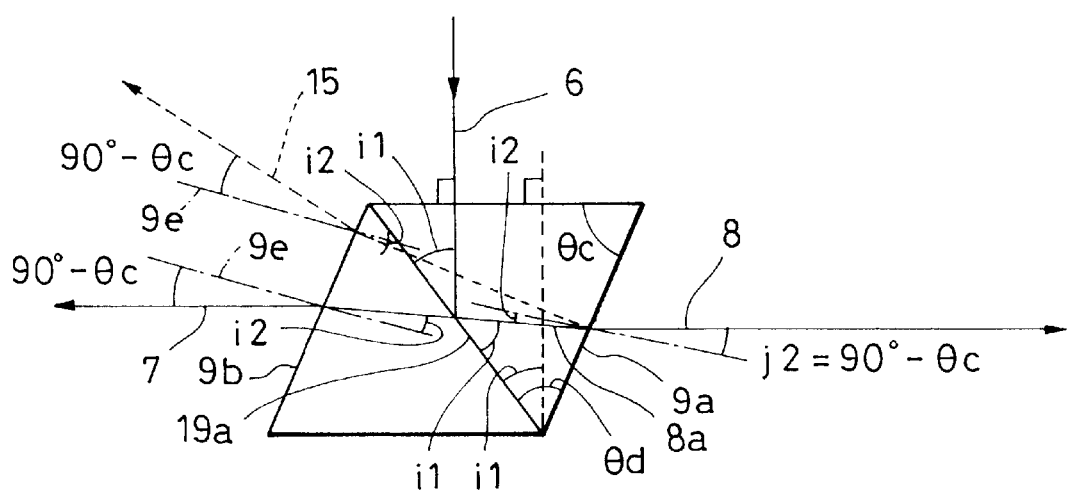
FIG. 10 shows the beam splitter of the second embodiment of FIG. 7.

FIG. 7 is a plan view showing a major portion of a second embodiment of the present invention. FIGS. 8, 9, and 10 are respectively explanatory views partly showing the second embodiment shown in FIG. 7. In this and other embodiments, the same reference numerals depict the same structure unless otherwise stated.

The second embodiment is different from the first embodiment in that a polarizing beam splitter 19 having a different shape is substituted for the polarizing beam splitter 5 in the light transmitting and receiving device in the first embodiment.

FIG. 9 is a perspective view showing a major portion of the polarizing beam splitter 19 of this embodiment, having a light incidence surface 12, transmission and reception surface 9a, light exit surface 9b, and polarizing beam splitting surface 19a. The polarizing beam splitter 19 is a quadrangular prism with a top surface 11a and a bottom surface 11b, both being parallelogrammatic or rhombic, and the light incidence (entrance) surface 12 and side surface 10, both being rectangular or square. In FIG. 9, reference numerals Q1, Q2, P1, P2, Q3, P3, Q4, and P4 represent the apexes of the polarizing beam splitter 19, while reference numerals Q1, P1, Q4, P4 also represent apexes of the polarizing beam splitting surface 19a.

The light incidence surface 12 is extended in parallel with the side surface 10. The light beam from the light emitting device 1 is condensed through the projection lens 2, and introduced through the light incidence surface 12 of the polarizing beam splitter 19. A light beam having a predetermined polarization axis is reflected from the polarizing beam splitting surface 19a, and is then transmitted through the transmission and reception surface 9a in a predetermined direction. A light beam having a predetermined polarization axis coming in from the predetermined direction passes through the transmission and reception surface 9a, polarizing beam splitting surface 19a, and light exit surface 9b, and is condensed through the light receiving lens 4 on the surface of the light receiving device 3.

FIG. 10 illustrates the optical paths of the polarizing beam splitter 19 of this embodiment. In the triangle having the polarizing beam splitting surface 19a as its base, let $\theta c$ represent an apex angle, and $\theta d$ represent the angle made between the polarizing beam splitting surface 19a and the transmission and reception surface 9a. Furthermore, let $i1$ represent the angle made between the optical axis 6 of the projection lens 2 and the polarizing beam splitting surface 19a. Then, $\theta d$ is expressed by equation (7).

$$\theta d = (90° - \theta c) + i1 \qquad (7)$$

The following equation (8) holds true in connection with the sum of the interior angles of the triangle formed by the polarizing beam splitting surface 19a, the transmission and reception surface 9a, and the principal light beam (projected light beam) 8a of the projected light incident on the transmission and reception surface 9a.

$$\theta d + i1 + (90° - i2) = 180°$$

therefore, $$i1 = 90° + i2 - \theta d \qquad (8)$$

From equations (7) and (8), $$\theta c + 2\theta d = 180° + i2$$

therefore, $$\sin(\theta c + 2\theta d) = \sin(180° + i2)$$

then, $$\sin(\theta c + 2\theta d) = -\sin(i2) \qquad (9)$$

Let n represent the refractive index of the optical material of the polarizing beam splitter 19, and the following equation will be derived from the law of refraction, $$n \cdot \sin(i2) = \sin(j2) = \sin(90° + \theta c)$$

Since $\sin(90° - \theta c) = \cos(\theta c)$, $$n \cdot \sin(i2) = \cos \theta c \qquad (10)$$

From equations (9) and (10), $$n \cdot \sin(\theta c + 2\theta d) / \cos(\theta c) = -1 \qquad (11)$$

The polarizing beam splitter 19 that satisfies equation (11) is located where the optical axis 6 of the projection lens 2 intersects the optical axis 7 of the light receiving lens 4 at a right angle in the positional relationship shown in FIGS. 7 and 8. The principal light beam 15 (where the principal beam 15 represents the central beam of light reflected from the transmission and reception surface 9a) is inclined at the angle of i2 with respect to the normal 9e of the light exit surface 9b into the side opposite to the side of the optical axis 7 of the light receiving optical system when the principal beam 15 of the beam reflected from the transmission and reception surface 9a is introduced into the light exit surface (opposing surface) 9b that is in parallel with the surface 9a as shown in FIG. 10. More particularly, the principal light beam 15 of the light reflected from the transmission and reception surface 9a, out of the projected light beam, exits toward the light receiving lens 4 at an angle of $2(90° - \theta c)$ with respect to the optical axis 7 of the light receiving lens 4.

Let f represent the focal length of the light receiving lens 4 and $\Phi$ represent the diameter of the effective entrance area of the light receiving device 3, and if the following equation (12) holds true, the light beam reflected from the transmission and reception surface 9a, of the projected light beam, is guided off the effective entrance surface of the light receiving device 3 for detecting the signal light.

$$f \tan\{2(90° - \theta c)\} > \Phi/2 \qquad (12)$$

When f=25 mm and $\Phi$=1 mm, for example, equation (12) is reduced as follows:

$$\theta c < 89.43°$$

If an optical material having n=1.76 is selected with $\theta c = 89°$, equation (11) becomes $$1.76 \cdot \sin(89° + 2\theta d)/\cos(89°) = -1$$

therefore, $\theta d = 45.78°$.

In this embodiment, the polarizing beam splitter 19 is constructed by attaching two triangular prisms, each with the apex angle $\theta c$ of its triangle set at 89° and one interior angle $\theta d$ of the base set at 45.78°, with both bases glued as the polarizing beam splitting surface 19a. In this case, by setting the angle $(90° - \theta c)$ between the transmission and reception surface 9a and the plane vertical to the axis 8 of transmission and reception to 1°, the light beam reflected from the transmission and reception surface 9a of the polarizing beam splitter 19, out of the projected light beam from the projection lens 2, is not received by the light receiving device 3 for detecting the signal light, and the cross-talk attributed to the reflection from the polarizing beam splitter 19 is thus precluded.

In this embodiment, fully satisfying the condition defined by equation (11) is not necessary. If the condition defined by the following equation is satisfied, the purpose of this embodiment is achieved.

$$-0.9 < \{n \cdot \sin(\theta c + 2\theta d)\}/\{\cos(\theta c)\} < -1.1$$

Figure 11:
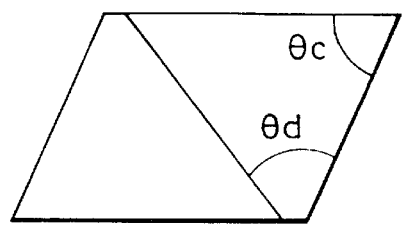
FIG. 11 shows another beam splitter of the second embodiment of FIG. 7.
Figure 12:
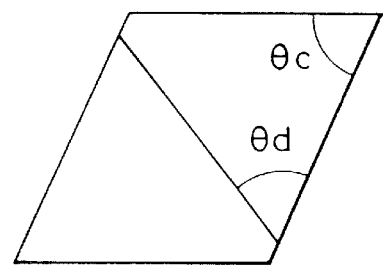
FIG. 12 shows another beam splitter of the second embodiment of FIG. 7.

The polarizing beam splitter 19 in this embodiment is constructed of two triangular prisms glued as shown in FIG. 10. One ridge of each prism may be beveled as shown in FIGS. 11 or 12. In this case, the above description applies to the original form of the prism, namely the prism prior to beveling.

The second embodiment described with reference to FIGS. 7 through 10 employs the quadrangular prism polarizing beam splitter 19 with the top surface 11a and bottom surface 11b parallelogrammatic or rhombic, wherein the apex angle $\theta c$ of the triangle with the polarizing beam splitting surface 19a as its base is an acute angle in the top surface 11a and bottom surface 11b. Referring to FIGS. 13 through 16, a modification of the second embodiment is now discussed in which the light transmitting and receiving device employs a polarizing beam splitter 24 with an obtuse angle $\theta c'$ as its apex angle.

Figure 16:
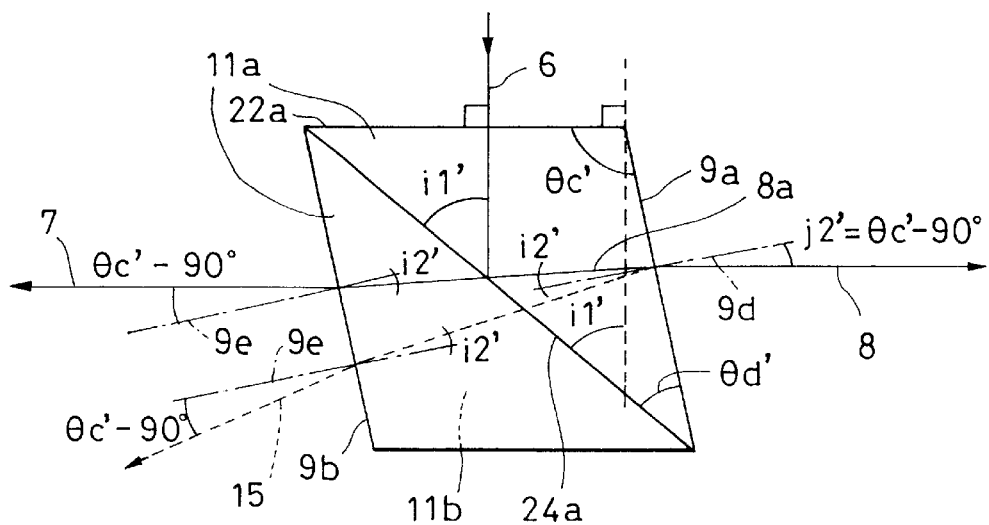
FIG. 16 shows the beam splitter of the modification of the second embodiment of FIG. 13.

As shown in FIG. 16, the polarizing beam splitter 24 has an obtuse apex angle of $\theta c'$ in a triangle with the polarizing beam splitting surface 24a as its base, and the angle represented by $\theta d'$ between the polarizing beam splitting surface 24a and the transmission and reception surface 9a. Let $i1'$ represent the angle between the optical angle 6 of the projection lens 2 and the polarizing beam splitting surface 24a.

As seen from FIG. 16, θd' is expressed as follows.

$$\theta d' = i1' - (\theta c' - 90°) \quad (13)$$

The following equation holds true of the triangle formed by the polarizing beam splitting surface 24a, the transmission and reception surface 9a and the projected light beam 8a incident on the transmission and reception surface 9a.

$$\theta d' + i1' + (90° + i2') = 180°$$

therefore, $$i1' = 90° - i2' - \theta d' \quad (14)$$

From equations (13) and (14), $$\theta c' + 2\theta d' = 180° - i2'$$

therefore, $$\sin(\theta c' + 2\theta d') = \sin(180° - i2')$$

then, $$\sin(\theta c' + 2\theta d') = \sin(i2') \quad (15)$$

Let n represent the refractive index of the optical material of the polarizing beam splitter 24, and the following equation will be derived from the law of refraction, $$n \cdot \sin(i2') = \sin(j2') = \sin(\theta c' - 90°)$$

Since $\sin(\theta c' - 90°) = -\cos(\theta c')$, $$n \cdot \sin(i2') = -\cos(\theta c') \quad (16)$$

From equations (15) and (16), $$n \cdot \sin(\theta c' + 2\theta d')/\cos(\theta c') = -1 \quad (17)$$

Figure 13:
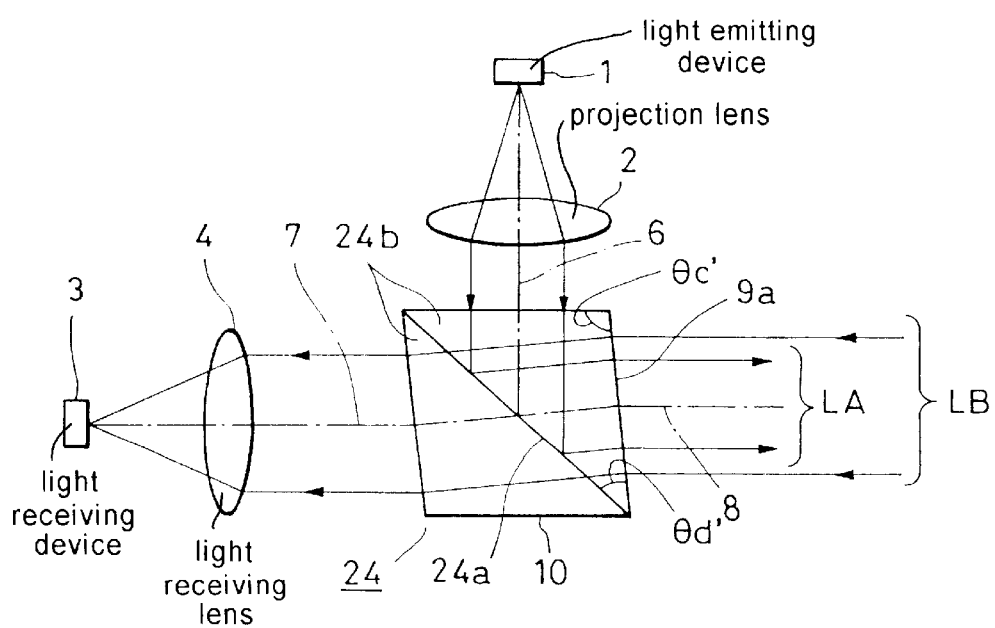
FIG. 13 is a plan view showing a major portion of a modification of the second embodiment of the present invention.
Figure 14:
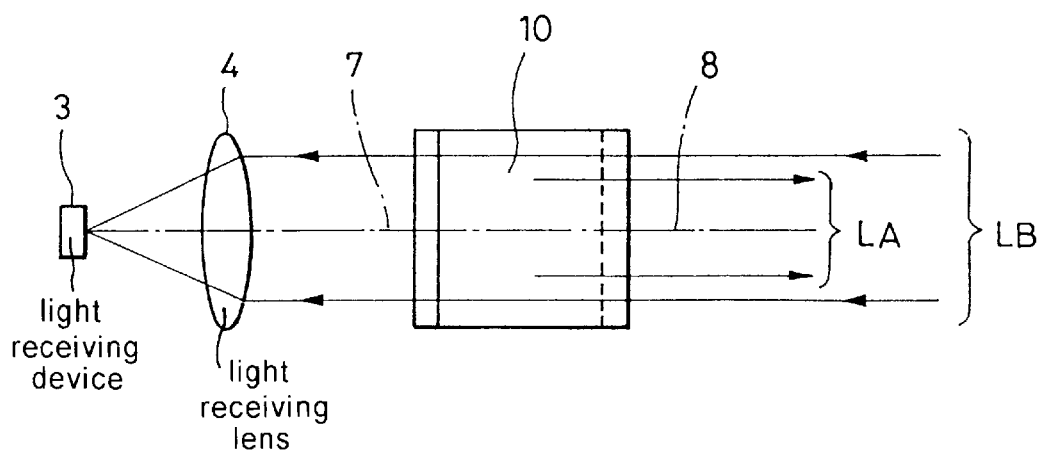
FIG. 14 partly shows the modification of the second embodiment of FIG. 13.

The polarizing beam splitter 24 that satisfies equation (17) is located where the optical axis 6 of the projection lens 2 intersects the optical axis 7 of the light receiving lens 4 at a right angle in the positional relationship shown in FIGS. 13 and 14. The principal beam 15 (where the principal beam 15 represents the central beam of light reflected from the transmission and reception surface 9a) is inclined at the angle of i2' with respect to the normal 9e of the light exit surface 9b into the side opposite to the side of the optical axis 7 of the light receiving lens 4 when the principal beam 15 of the beam reflected from the transmission and reception surface 9a is introduced into the light exit surface (opposing surface) 9b that is in parallel with the transmission and reception surface 9a as shown in FIG. 16. More particularly, the principal light beam 15 of the light reflected from the transmission and reception surface 9a, out of the projected light beam, exits toward the light receiving lens 4 at an angle of 2(θc−90°) with respect to the optical axis 7 of the light receiving lens 4.

Let f represent the focal length of the light receiving lens 4 and Φ represent the diameter of the effective entrance area of the light receiving device 3, and if the following equation (18) holds true, the light beam reflected from the transmission and reception surface 9a, of the projected light beam, is guided off the effective entrance surface of the light receiving device 3 for detecting the signal light.

$$f \tan\{2(\theta c' - 90°)\} > \Phi/2 \quad (18)$$

When f=25 mm and Φ=1 mm, for example, equation (18) is reduced as follows:

$$\theta c' > 90.57°$$

If an optical material having n=1.76 is selected with θc'=91°, equation (17) becomes $$1.76 \cdot \sin(91° + 2\theta d')/\cos(91°) = -1$$

therefore, θd'=44.21°.

In this embodiment, the quadrangular polarizing beam splitter 24 is constructed by attaching two triangular prisms, each with the apex angle θc' of its triangle set at 91° and one interior angle θd' of the base set at 44.21°, with both bases glued as the polarizing beam splitting surface 24a. In this case, by setting the angle (θc'−90°) between the transmission and reception surface 9a and the plane vertical to the axis 8 of transmission and reception to 1°, the light beam reflected from the transmission and reception surface 9a of the polarizing beam splitter 24, out of the projected light beam from the projection lens 2, is not received by the light receiving device 3 for detecting the signal light, and the cross-talk attributed to the reflection from the polarizing beam splitter 24 is thus precluded.

Figure 15:
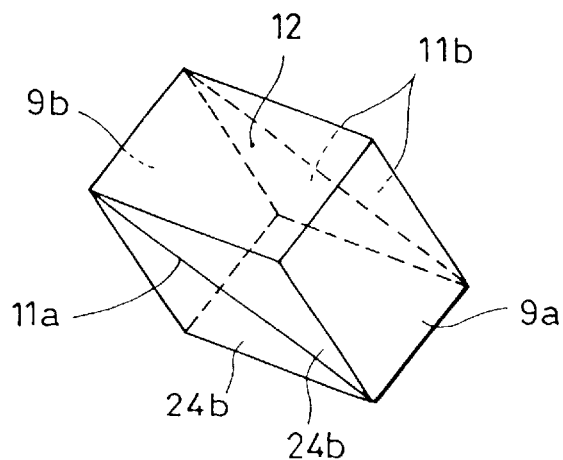
FIG. 15 shows the beam splitter of the modification of the second embodiment of FIG. 13.
Figure 17:
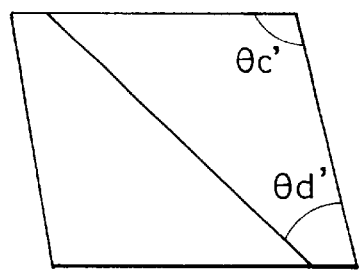
FIG. 17 shows another beam splitter of the modification of the second embodiment of FIG. 13.
Figure 18:
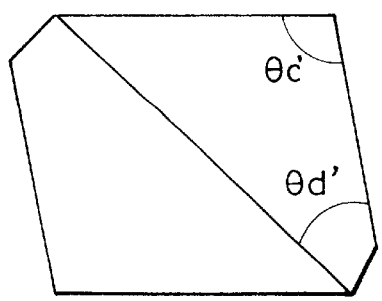
FIG. 18 shows another beam splitter of the modification of the second embodiment of FIG. 13.

The polarizing beam splitter 24 in this embodiment is constructed of two triangular prisms glued as viewed from the top surface 24b, as shown in FIGS. 15 and 16. The ridge of each triangular prism may be beveled as shown in FIGS. 17 or 18. In this case, the above description applies to the original form of the prism, namely the prism prior to beveling.

The second embodiment and its modification are summarized as follows.

The two triangular prisms having triangle faces are glued together to form the quadrangular polarizing beam splitter with the top surface 11a and bottom surface 11b parallelogrammatic or rhombic as shown in FIG. 9 or FIG. 15. Let θc represent the apex angle subtended by the border of the polarizing beam splitting surface 19a or 24a, regardless of whether it is an acute angle or obtuse angle, θd represent the angle between the polarizing beam splitting surface 19a or 24a and the transmission and reception surface 9a, and n represent the refractive index of the optical material of the polarizing beam splitter. The light beam reflected from the transmission and reception surface 9a exits from the light exit surface 9b which is in parallel with the transmission and reception surface 9a, and is introduced into the light receiving lens 4 at an angle of 2|90°−θc| with respect to the optical axis 7 of the light receiving lens 4 as long as equation (11) holds true.

Let f represent the focal length of the light receiving lens 4 and Φ represent the diameter of the effective entrance area of the light receiving device 3, and if the following equation (19) holds true, the light beam reflected from the transmission and reception surface 9a, of the projected light beam, is guided off the effective entrance surface of the light receiving device 3 for detecting the signal light.

$$f \tan\{2|90° - \theta c|\} > \Phi/2 \quad (19)$$

In this way, the cross-talk attributed to the reflection from the polarizing beam splitter is precluded.

Figure 19:
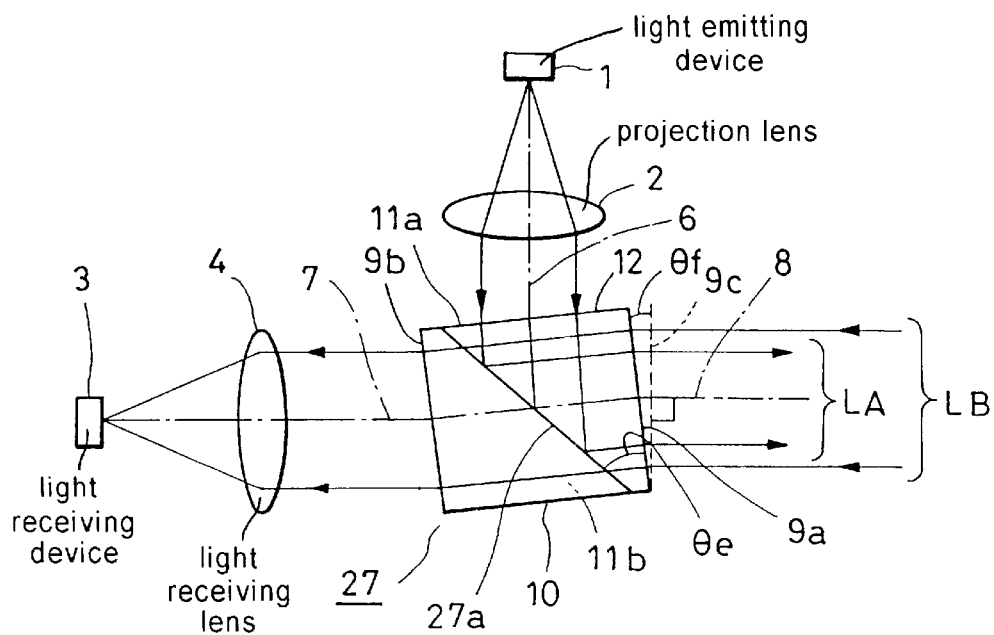
FIG. 19 is a plan view showing a major portion of a third embodiment of the present invention.
Figure 20:
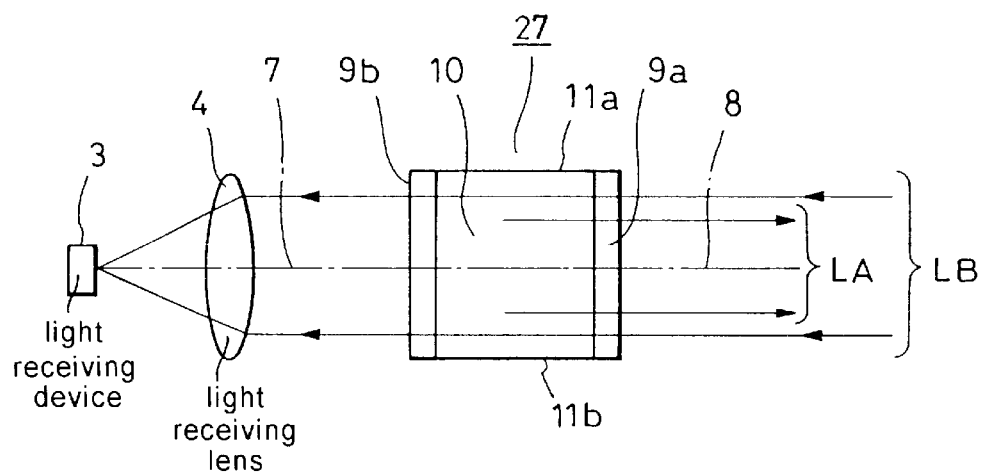
FIG. 20 partly shows the third embodiment of FIG. 19.
Figure 21:
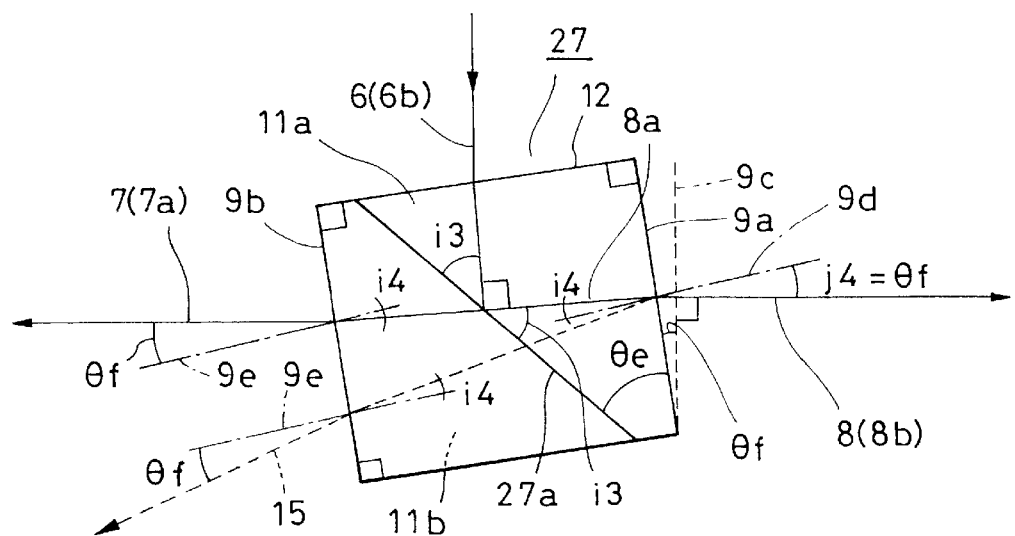
FIG. 21 shows the beam splitter of the third embodiment of FIG. 19.

FIG. 19 shows a major portion of a third embodiment of the present invention, and FIGS. 20 and 21 partly show the device of FIG. 19.

The third embodiment is different from the first embodiment in that a polarizing beam splitter 27 having a different shape is substituted for the polarizing beam splitter 5 in the light transmitting and receiving device in the first embodiment, and the rest of the construction remains unchanged. As shown in FIGS. 19 and 20, the polarizing beam splitter 27 is a rectangular parallelopiped or a cube that is formed by attaching two triangular prisms having right-angled triangle faces, each triangular prism with one acute-angle ridge relatively largely beveled, with the base sides as polarizing beam splitting surface 27a subtending a right apex angle interfaced with each other.

In the polarizing beam splitter 27 as shown in the plan view in FIG. 19, the polarizing beam splitting surface 27a is arranged at the intersection where the optical axis 6 of the projection lens 2 intersects the optical axis 7 of the light receiving lens 4 at a right angle so that the polarizing beam splitting surface 27a is vertical to the plane in which both the optical axis 6 of the projection lens 2 and the optical axis 7 of the light receiving lens 4 lie. The transmission and reception surface 9a is inclined at an angle of θf with respect to a plane vertical to the transmission and reception axis 8. The polarizing beam splitting surface 27a makes an angle of θe with respect to the transmission and reception surface 9a.

FIG. 21 shows the optical paths of the polarizing beam splitter 27 in connection with the transmission and reception axis 8 from the transmission and reception surface 9a, the optical axis 7 of the light receiving lens 4, and the principal light beam 15 of the light reflected from the transmission and reception surface 9a, of the projected light beam. The optical paths are now discussed.

Let j4 represent the angle made between the principal light beam 8b of the projected light from the transmission and reception surface 9a on the transmission and reception axis 8 and the normal 9d of the surface 9a, and j4=θf. The right-angled polarizing beam splitter 27 is inclined where the optical axis 6 of the projection lens 2 and the optical axis 7 of the light receiving lens 4 intersect each other at a right angle. The light beam is introduced from the projection lens 2 into the light incidence surface of the polarizing beam splitter 27, and the principal light beam 6b of the projection lens on the optical axis 6 is perpendicular to the optical axis 7 of the light receiving lens 4 even within the polarizing beam splitter 27. The angle made between the polarizing beam splitting surface 27a and the principal light beam 6b is thus equal to the angle made between the polarizing beam splitting surface 27a and the principal light beam 8a of the projected light reflected from the polarizing beam splitting surface 27a.

Let i3 represent this angle, and $$i3=45°\qquad(20)$$

Let i4 represent the angle of incidence of the principal light beam 8a of the projected light incident on the transmission and reception surface 9a, and the following equation holds true of the sum of the interior angles of the triangle formed by the polarizing beam splitting surface 27a, the principal light beam 8a of the projected light incident on the transmission and reception surface 9a, and the transmission and reception surface 9a.

$$θe+(90°+i4)+i3=180°\qquad(21)$$

From equations (20) and (21), $$θe+i4=45°\qquad(22)$$

Let n represent the refractive index of the optical material of the polarizing beam splitter 27, and equation (23) will be derived from the law of refraction, $$n·\sin(i4)=\sin(j3)=\sin(θf)\qquad(23)$$

From equations (22) and (23), $$n·\sin(45°-θe)/\sin(θf)=1\qquad(24)$$

In this embodiment, the polarizing beam splitter 27 that satisfies equation (24) is located where the optical axis 6 of the projection lens 2 intersects the optical axis 7 of the light receiving lens 4 at a right angle in the positional relationship shown in FIGS. 19 and 20. The principal beam 15 is inclined at the angle of θf with respect to the normal 9e of the light exit surface 9b into the side opposite to the side of the principal light beam 7a of the received light when the principal beam 15 of the beam reflected from the transmission and reception surface 9a is introduced into the light exit surface 9b that is in parallel with the surface 9a as shown in FIG. 21. More particularly, the principal light beam is introduced into the light receiving lens 4 at an angle of 2θf with respect to the principal light beam 7a of the received light.

Let f represent the focal length of the light receiving lens 4 and Φ represent the diameter of the effective entrance area of the light receiving device 3, and if the following equation holds true, the light beam reflected from the transmission and reception surface 9a, of the projected light beam, is guided off the effective entrance surface of the light receiving device 3 for detecting the signal light.

$$f\tan(2θf)>Φ/2\qquad(25)$$

When f=25 mm and Φ=1 mm, for example, equation (25) is reduced as follows:

$$θf>0.57°$$

If an optical material having n=1.76 is selected with θf=1°, equation (24) is $$1.76·\sin(45°-θe)/\sin(1°)=1$$

therefore, θe=44.43°.

In this embodiment, the quadrangular polarizing beam splitter 27 is constructed by attaching two triangular prisms, each with one of the interior angles of the base θe set at 44.43° and the apex angle subtended by the base set to be a right angle, with both bases glued as the polarizing beam splitting surface 27a. In this case, by setting the angle θf between the transmission and reception surface 9a and the plane 9c vertical to the axis 8 of transmission and reception to 1° with the angle between the transmission and reception surface 9a and the polarizing beam splitting surface 27a represented by θe, the light beam reflected from the transmission and reception surface 9a of the polarizing beam splitter 27, out of the projected light beam from the light emitting device 1 for generating the signal light, is not received by the light receiving device 3 for detecting the signal light, and the cross-talk attributed to the reflection from the polarizing beam splitter 27 is thus precluded.

Figure 22:
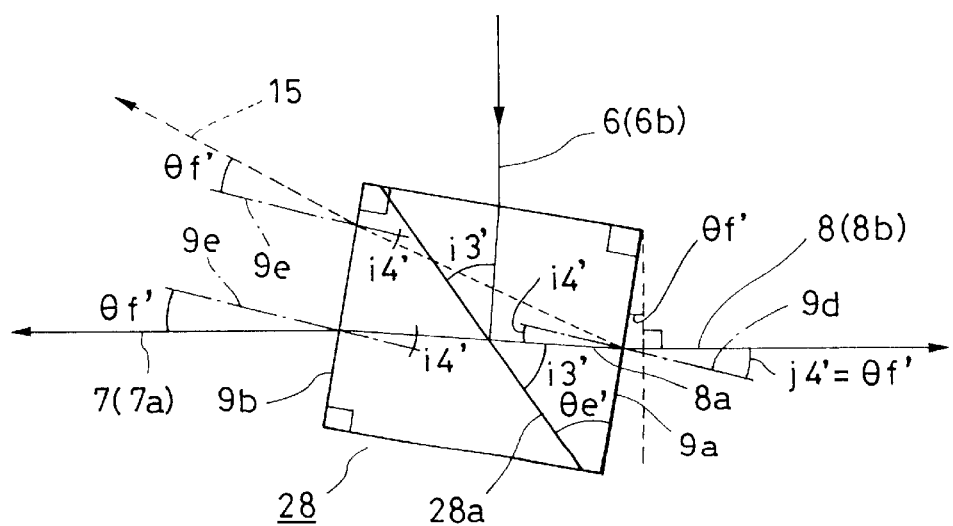
FIG. 22 shows another beam splitter of the third embodiment of FIG. 19.

In the third embodiment described with reference to FIGS. 19 through 21, the polarizing beam splitter 27 is counterclockwise rotated by θf in the plane in which the optical axis 6 of the projection lens 2 and the optical axis 7 of the light receiving lens 4 lie as shown in FIG. 19. Conversely, in an alternative construction, a polarizing beam splitter 28 is clockwise rotated by θf' as shown in FIG. 22. Let θe' represent the angle between the polarizing beam splitting surface 28a and the transmission and reception surface 9a, and j4' represent the angle between the principal light beam 8b of the projected light from the transmission and reception surface 9a and the normal 9d of the transmission and reception surface 9a, and j4'=θf'.

FIG. 22 shows the optical paths of the polarizing beam splitter 28 in connection with the principal light beam 8b of the projected light from the transmission and reception surface 9a, the principal light beam 7a of the received light, and the principal light beam 15 of the light reflected from the transmission and reception surface 9a, of the projected light beam. As already described with reference to the polarizing beam splitter 27 shown in FIG. 21, $$i3'=45° \quad (26)$$

Let i4' represent the angle of incidence of the principal light beam 8a of the projected light incident on the transmission and reception surface 9a, and the following equation (27) holds true of the sum of the interior angles of the triangle formed by the polarizing beam splitting surface 28a, the principal light beam 8a of the projected light incident on the transmission and reception surface 9a, and the transmission and reception surface 9a.

$$\theta e'+i3'+(90°-i4')=180° \quad (27)$$

From equations (26) and (27), $$\theta e'-i4'=45° \quad (28)$$

Let n represent the refractive index of the optical material of the polarizing beam splitter 28, and equation (29) will be derived from the law of refraction, $$n\cdot\sin(i4)=\sin(j4')=\sin(\theta f') \quad (29)$$

From equations (28) and (29), $$n\cdot\sin(\theta e'-45°)/\sin(\theta f')=1 \quad (30)$$

In this embodiment, the polarizing beam splitter 28 that satisfies equation (30) is located in the positional relationship shown in FIG. 22 in the light transmitting and receiving device shown in FIG. 19. The reflected light beam from the transmission and reception surface 9a is inclined at the angle of i4' with respect to the normal 9e of the light exit surface 9b into the side opposite to the side of the optical axis 7 of the light receiving lens 4 when the beam reflected from the transmission and reception surface 9a is introduced into the light exit surface 9b that is in parallel with the surface 9a. More particularly, the reflected light beam from the transmission and reception surface 9a is introduced into the light receiving lens 4 at an angle of 2θf' with respect to the optical axis 7 of the light receiving lens 4.

Let f represent the focal length of the light receiving lens 4 and Φ represent the diameter of the effective entrance area of the light receiving device 3, and if the following equation holds true, the light beam reflected from the transmission and reception surface 9a, of the projected light beam, is guided off the effective entrance surface of the light receiving device 3 for detecting the signal light.

$$f\tan(2\theta f')>\Phi/2 \quad (31)$$

When f=25 mm and Φ=1 mm, for example, equation (31) is reduced as follows:

$$\theta f'>0.57°$$

If an optical material having n=1.76 is selected with θf=1, equation (30) is $$1.76\cdot\sin(\theta e'-45°)/\sin(1°)=1$$

therefore, θe'=45.57°.

In this embodiment, the quadrangular polarizing beam splitter 28 is constructed by attaching two triangular prisms, each with the angle θe' between the base (polarizing beam splitting surface 28a) and the transmission and reception surface 9a set to be 45.57° and the apex angle subtended by the base set to be a right angle, with both bases glued as the polarizing beam splitting surface 28a. The polarizing beam splitter 28 is arranged at the intersection where the optical axis 6 of the projection lens 2 and the optical axis 7 of the light receiving lens 4 intersect each other at a right angle. The transmission and reception surface 9a makes the angle of θe' with respect to the polarizing beam splitting surface 28a in a plane in which both optical axes 7 and 8 lie. The transmission and reception surface 9a is clockwise rotated by θf'=1 relative to the plane vertical to the transmission and reception axis 8 so that the light beam reflected from the transmission and reception surface 9a of the polarizing beam splitter 28, out of the projected light beam from the light emitting device 1 for generating the signal light, is not received by the light receiving device 3 for detecting the signal light.

From equations (24) and (28), the two polarizing beam splitters 27 and 28 described above are analyzed as follows.

The two triangular prisms having right-triangle faces are glued together to form the rectangular or cubic polarizing beam splitter. Let θe represent the interior angle of the triangle other than a right angle, θf represent the angle that the transmission and reception surface 9a makes with respect to the plane vertical to the transmission and reception axis 8 without paying attention to the direction of the transmission and reception surface 9a with respect to the axis 8, and n represent the refractive index of the optical material of the polarizing beam splitter, and with the following equation (32) holding true, the principal light beam 15 reflected from the transmission and reception surface 9a of the projected light beam is introduced into the light receiving lens 4 at the angle 2θf with respect to the principal light beam 7a of the received light beam.

$$n\cdot\sin|\theta e-45°|/\sin|\theta f|=1 \quad (32)$$

Let f represent the focal length of the light receiving lens 4 and Φ represent the diameter of the effective entrance area of the light receiving device 3, and if the following equation (33) holds true, the light beam reflected from the transmission and reception surface 9a, of the projected light beam, is guided off the effective entrance surface of the light receiving device 3 for detecting the signal light.

$$f\tan|2\theta f|>\Phi/2 \quad (33)$$

In this embodiment, fully satisfying the condition defined by equation (32) is not necessary. If the condition defined by the following equation is satisfied, the purpose of this embodiment is achieved.

$$0.9<|\{n\cdot\sin(\theta e-45°)\}/\{\sin(\theta f)\}|<1.1$$

Figure 23:
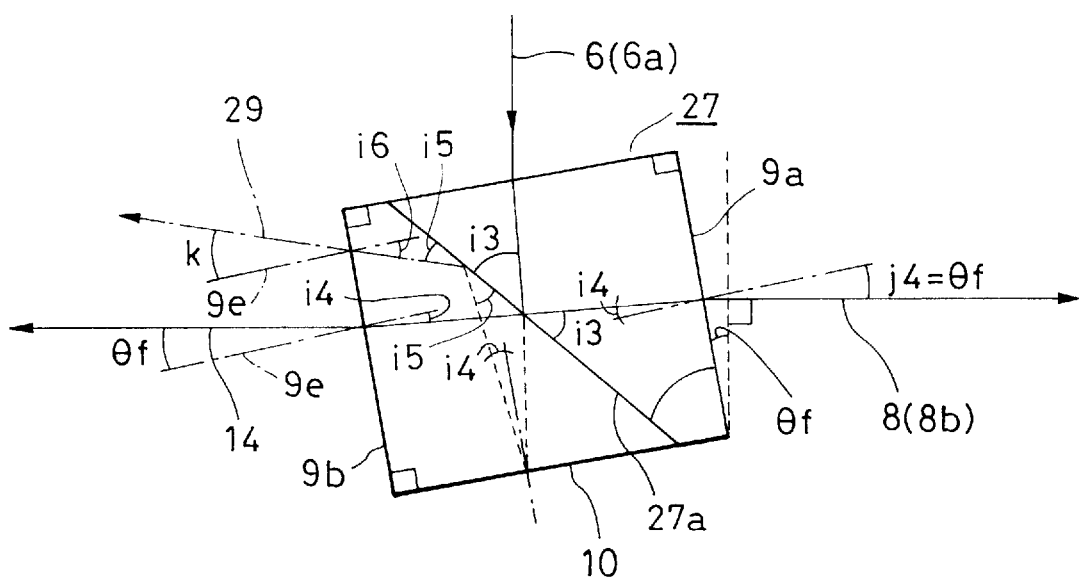
FIG. 23 shows another beam splitter of the second embodiment of FIG. 19.
Figure 24:
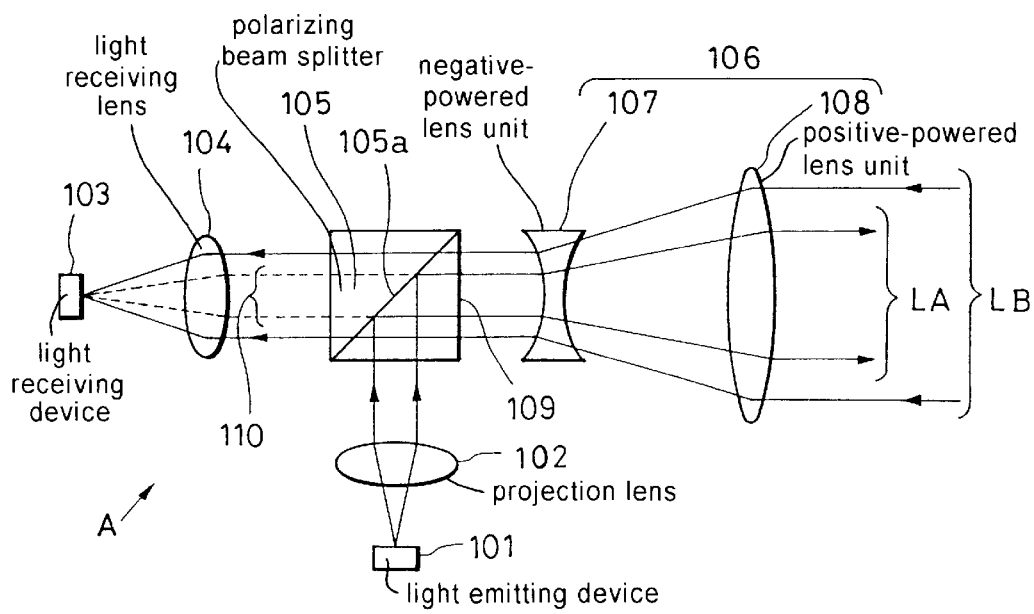
FIG. 24 is a plan view showing a major portion of a conventional light transmitting and receiving device.
Figure 25:
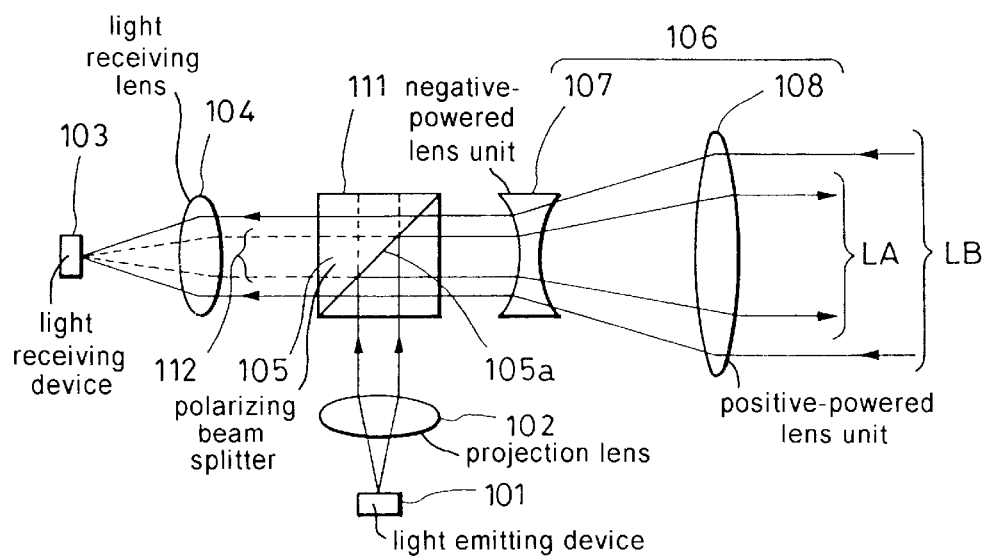
FIG. 25 is a plan view showing a major portion of a conventional light transmitting and receiving device.

FIG. 23 shows in the polarizing beam splitter 27 a light beam 29, part of the projected light beam, which is transmitted through the polarizing beam splitting surface 27a, reaches and is reflected from the surface (side surface) 10, is reflected from the polarizing beam splitting surface 27a, and travels to the light receiving lens 4.

In the optical path diagram shown in FIG. 23, let i5 represent the angle between the principal light beam 29 reflected from the surface 10 subsequent to being transmitted through the polarizing beam splitting surface 27a, out of the projected light beam, and the polarizing beam splitting surface 27a, and i6 represent the angle between the principal light beam 29 reflected from the polarizing beam splitting surface 27a and then traveling to the surface (light exit surface) 9b of the polarizing beam splitter 27 to the side of the light receiving lens 4, and the normal 9e of the light exit surface 9b.

The following equation holds true of the sum of the interior angles of the triangle formed by the side surface 10 at which the part of the projected light beam arrives subsequent to being transmitted through the polarizing beam splitting surface 27a, and the light beam 29 reflected from the surface 10, and the polarizing beam splitting surface 27a.

$$(90°-\theta e)+(90°+i4)+i5=180°$$

thus, $$i5=\theta e-i4 \quad (34)$$

The following equation holds true of the triangle formed by the polarizing beam splitting surface 27a, the reflected light beam from the polarizing beam splitting surface 27a toward the light receiving lens 4, and the normal 9e of the light exit surface 9b to the side of the light receiving lens 4.

$$i5+i6=90°-\theta e \quad (35)$$

From equations (34) and (35), $$i6=90°-2\theta e+i4 \quad (34)$$

Let k represent the angle between the light beam, reflected from the surface 10, exiting through the light exit surface 9b of the polarizing beam splitter 27 to the side of the light receiving lens 4 and the normal 9e of the light exit surface 9b, and n represent the refractive index of the polarizing beam splitter 27, and the following equation is provided from the law of refraction.

$$\sin(k)=n\cdot\sin(i) \quad (37)$$

From equations (36) and (37), $$\sin(k)=n\cdot\sin(90°-2\theta e+i4) \quad (38)$$

Let f represent the focal length of the light receiving lens 4 and Φ represent the diameter of the effective entrance area of the light receiving device 3, and if the following equation (39) holds true, the principal light beam 29 traveling toward the light receiving lens 4, of the reflected light from the surface 10, is guided off the effective entrance surface of the light receiving device 3 for detecting the signal light.

$$f\cdot\tan(k-\theta f)>\Phi/2 \quad (39)$$

The condition presented by the following equations (40) and (41) is satisfied in the above embodiment in which, out of the projected light beam from the projection lens 2, the reflected light beam from the transmission and reception surface 9a is received off the effective entrance surface of the light receiving device 3 for detecting the signal light.

$$f=25 \text{ mm}, \Phi=1 \text{ mm}, n=1.76 \quad (40)$$

$$\theta f=1°, \theta e=44.43°, i4=0.57° \quad (41)$$

To consider the principal light beam 29, of the light reflected from the surface 10, traveling to the light receiving lens 4 under the same condition, conditions of equations (40) and (41) are substituted in equation (38), $$k=3.01°$$

Equations (40) and (41) and the value of k satisfy equation (39).

The above-described polarizing beam splitter 27 described with reference to FIGS. 19 through 21 reliably guides, off the effective entrance surface of the light receiving device 3 for detecting the signal light, not only the light beam reflected from the transmission and reception surface 9a of the projected light beam but also the light beam traveling to the light receiving lens 4, of the reflected light beam from the surface 10 subsequent to being transmitted through the polarizing beam splitting surface 27a.

In this embodiment, the surface 10 needs no particular antireflection process.

According to the present invention, the light transmitting and receiving device for use as an optical communication device for accurate optical communication is provided in which at least first noise light or second noise light is efficiently prevented from entering the light receiving element by setting up the appropriate form of the polarizing beam splitter through which transmission and reception of beams are performed for two-way optical communication.

According to the present invention, with the polarizing beam splitting surface and the transmission and reception surface appropriately angled with respect to the light transmission and reception axis in the polarizing beam splitter, the light beam reflected from the transmission and reception surface, out of the projected light beam, is guided off the effective entrance surface of the light receiving device for detecting the signal light, and the cross-talk attributed to the surface reflection from the transmission and reception surface of the polarizing beam splitter, of the projected light beam, is thus precluded.

According to the present invention, not only the above reflected light beam of the projected light beam, but also the light beam traveling to the light receiving means, of the light beam reflected from the surface that is reached after being transmitted through the polarizing beam splitting surface, is guided off the effective entrance surface of the light receiving device for detecting the signal light. The surface that is reached by the light beam after being transmitted through the polarizing beam splitting surface needs no particular antireflection process. The polarizing beam splitter on all surfaces is free from the cause of cross-talk attributed to the surface reflection.

Except as otherwise disclosed herein, the various components shown in outline or in block form in the figures are individually well-known and their internal construction and operation are either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light transmitting and receiving device comprising:
   a light projecting unit having an optical axis of projection;
   a light receiving unit having an optical axis of reception; and
   an optical member, disposed where the optical axis of projection intersects the optical axis of reception, said optical member including therewithin a light beam splitter which reflects one of a light beam from said light projecting unit and a light beam travelling to said light receiving unit while transmitting therethrough the other of the light beam from said light projecting unit and the light beam travelling to said light receiving unit, wherein said optical member has (a) a transmission and reception surface, spaced from said light beam splitter and being an exterior surface of said optical member so that said transmission and reception surface is the last surface of said optical member through which the light beam from said light projecting unit is transmitted and (b) a surface opposing the transmission and reception surface, wherein the transmission and reception surface and the opposing surface are mutually parallel and are inclined with respect to the optical axis of transmission and reception along which the transmitted light beam exits from the transmission and reception surface so that the optical axis of transmission and reception is not perpendicular to the transmission and reception surface, wherein the optical axis of projection and the optical axis of reception are perpendicular to each other, and wherein the inclination angle is such that the principal ray of the light beam reflected from the transmission surface is not received by said light receiving unit.

2. A light transmitting and receiving device according to claim 1, wherein said light projecting unit comprises a light source for emitting a polarized light beam and wherein said light beam splitter is a polarizing beam splitter.

3. A light transmitting and receiving device according to claim 1, wherein said optical member has an entrance surface on which the light beam from said light projecting unit is incident and a surface opposing the entrance surface, and wherein at least one of the entrance surface and the opposing surface is parallelogrammatic in shape.

4. A light transmitting and receiving device according to claim 3, wherein said optical member has an entrance surface on which the light beam from said light projecting unit is incident and a surface opposing the entrance surface, and wherein at least one of the entrance surface and the opposing surface is rhombic in shape.

5. A light transmitting and receiving device according to claim 4, wherein the transmission and reception surface of said optical member is rectangular in shape.

6. A light transmitting and receiving device according to claim 4, wherein the transmission and reception surface of said optical member is square in shape.

7. A light transmitting and receiving device according to claim 3, wherein the transmission and reception surface of said optical member is rectangular in shape.

8. A light transmitting and receiving device according to claim 3, wherein the transmission and reception surface of said optical member is square in shape.

9. A light transmitting and receiving device according to claim 1, wherein said optical member has a side surface in parallel with the plane in which both the optical axis of reception and the optical axis of projection lie, and wherein the side surface is parallelogrammatic in shape.

10. A light transmitting and receiving device according to claim 9, wherein the transmission and reception surface of said optical member is rectangular in shape.

11. A light transmitting and receiving device according to claim 9, wherein the transmission and reception surface of said optical member is square in shape.

12. A light transmitting and receiving device according to claim 1, wherein said optical member has a side surface in parallel with the plane in which both the axis of reception and the optical axis of projection lie, and wherein the side surface is rhombic in shape.

13. A light transmitting and receiving device according to claim 12, wherein the transmission and reception surface of said optical member is rectangular in shape.

14. A light transmitting and receiving device according to claim 12, wherein the transmission and reception surface of said optical member is square in shape.

15. An optical member for use with a light transmitting and receiving apparatus, the apparatus having (a) light projection means for projecting light, the light projection means having an optical axis of projection, and (b) light receiving means for receiving light, the light receiving means having an optical axis of reception, wherein said optical member is disposed where the optical axis of projection and the optical axis of reception intersect, said optical member comprising:

a top surface;

a bottom surface opposing and parallel to the top surface;

a light entrance surface for receiving light from the light projection means;

a side surface opposing and parallel to the light entrance surface;

a light transmission and reception surface extending between the light entrance surface and the side surface;

a light exit surface opposing and parallel to the light transmission and reception surface; and a polarizing light beam splitting surface inside said optical member, wherein each of the top surface, the bottom surface, the light entrance surface, the side surface, the light transmission and reception surface, and the light exit surface is an exterior surface of said optical member, wherein light from the light projecting means enters the light entrance surface, is reflected by the polarizing light beam splitting surface, and exits from said optical member through the light transmission and reception surface, while incoming light passes through the light transmission and reception surface, is transmitted through the polarizing light beam splitting surface, and exits through the light exit surface to the light receiving means, and wherein the central beam of the light exiting through the light transmission and reception surface is inclined with respect to a line normal to the light transmission and reception surface, wherein said light transmission and reception surface is spaced from said polarizing light beam splitting surface and since said light transmission and reception surface is an exterior surface of said optical member, said light transmission and reception surface is the last surface of said optical member through which the light beam from said light projecting means is transmitted, wherein the optical axis of projection and the optical axis of reception are perpendicular to each other.

16. An optical member according to claim 15, wherein said optical member is a quadrangular prism.

17. An optical member according to claim 15, wherein said optical member comprises two triangular prisms, having bases joined to form the polarizing light beam splitting surface.

18. An optical member according to claim 15, wherein each of the top surface and the bottom surface is rectangular or square, and each of the light entrance surface and the side surface is parallelogrammatic or rhombic.

19. An optical member according to claim 15, wherein each of the top surface and the bottom surface is parallelogrammatic or rhombic, and each of the light entrance surface and the side surface is rectangular or square.

20. An optical member according to claim 15, wherein the side surface is parallel with the plane in which both the optical axis of projection and the optical axis of reception lie.

21. An optical member according to claim 15, wherein the optical axis of projection and the optical axis of reception are perpendicular.

22. An optical member according to claim 15, wherein where the transmission and reception surface is inclined with respect to the polarizing beam splitting surface by an angle θA the polarizing beam splitting surface is inclined by an angle of θB with respect to a plane perpendicular to the optical axis of projection, and n is the refractive index of said optical member, the following relationship is satisfied:

$$0.9 < (n \cdot \sin(\theta A))/(\sin(\theta A + \theta B)) < 1.1.$$

23. An optical member according to claim 22, wherein the following relationship is satisfied:

$$n \cdot \sin(\theta A) = \sin(\theta A + \theta B).$$

24. An optical member according to claim 15, wherein if θc represents the apex angle between said light entrance surface and said light transmission and reception surface, and θd represents the angle between said polarizing light beam splitting surface and said light transmission and reception surface, and n represents the index of refraction of said optical member, then following relationship is satisfied:

$$-0.9 < \{n \cdot \sin(\theta c + 2\theta d)\}/\{\cos(\theta c)\} < -1.1.$$

25. An optical member according to claim 24, wherein the following relationship is satisfied:

$$n \cdot \sin(\theta c + 2\theta d)/\cos(\theta c) = -1.$$

26. An optical member according to claim 15, wherein said optical member comprises two triangular prisms attached together, wherein each triangular prism forms a right interior angle and interior angles other than a right angle, wherein if θe represents an interior angle of one of the triangular prisms other than the right angle, if θf represents the angle that said light transmission and reception surface makes with a plane vertical to a transmission and reception axis of said light transmission and reception surface, and if n represents the refractive index of said optical member, the following relationship is satisfied:

$$0.9 < |\{n \cdot \sin(\theta e - 45°)\}/\{\sin(\theta f)\}| < 1.1.$$

27. An optical member according to claim 26, wherein the following relationship is satisfied:

$$n \cdot \sin|\theta e - 45°|/\sin|\theta f| = 1.$$

28. A light transmitting and receiving device comprising:
a light projecting unit having an optical axis of projection;
a light receiving unit having an optical axis of reception; and
an optical member, disposed where the optical axis of projection intersects the optical axis of reception, said optical member including therewithin a light beam splitter which reflects one of a light beam from said light projecting unit and a light beam travelling to said light receiving unit while transmitting therethrough the other of the light beam from said light projecting unit and the light beam travelling to said light receiving unit, wherein said optical member has a transmission surface, spaced from said light beam splitter and being an exterior surface of said optical member so that said transmission surface is the last surface of said optical member through which the light beam from said light projecting unit is transmitted when traveling from said optical member to said light receiving unit, wherein a line normal to the transmission surface is inclined with respect to the principal ray of the transmitted light beam from the transmission surface, and wherein the inclination angle is such that the principal ray of the light beam reflected from the transmission surface is not received by said light receiving unit.

29. A light transmitting and receiving device according to claim 28, wherein said light projecting unit comprises a light source for emitting a polarized light beam, and wherein said light beam splitter is a polarizing beam splitter.

30. A light transmitting and receiving device according to claim 29, wherein where the transmission surface is inclined with respect to a polarizing beam splitting surface of said polarizing beam splitter by an angle θA, the polarizing beam splitting surface is inclined by an angle of θB with respect to a plane perpendicular to the optical axis of projection, and n is the refractive index of said optical member, the following relationship is satisfied:

$$0.9 < (n \cdot \sin(\theta A))/(\sin(\theta A + \theta B)) < 1.1.$$

31. A light transmitting and receiving device according to claim 30, wherein the following relationship is satisfied:

$$n \cdot \sin(\theta A) = \sin(\theta A + \theta B).$$

32. A light transmitting and receiving device according to claim 29, wherein if θc represents the apex angle between a light entrance surface and the transmission surface, and θd represents the angle between the polarizing beam splitting surface and the transmission surface, and n represents the index of refraction of said optical member, then following relationship is satisfied:

$$-0.9 < \{n \cdot \sin(\theta c + 2\theta d)\}/\{\cos(\theta c)\} < 31\ 1.1.$$

33. A light transmitting and receiving device according to claim 32, wherein the following relationship is satisfied:

$$n \cdot \sin(\theta c + 2\theta d)/\cos(\theta c) = -1.$$

34. A light transmitting and receiving device according to claim 29, wherein said optical member comprises two triangular prisms attached together, wherein each triangular prism forms a right interior angle and interior angles other than a right angle, wherein if θe represents an interior angle of one of the triangular prisms other than the right angle, if θf represents the angle that the transmission surface makes with a plane vertical to a transmission and reception axis of the transmission surface, and if n represents the refractive index of said optical member, the following relationship is satisfied:

$$0.9 < |\{n \cdot \sin(\theta e - 45°)\}/\{\sin(\theta f)\}| < 1.1.$$

35. A light transmitting and receiving device according to claim 34, wherein the following relationship is satisfied:

$$n \cdot \sin|\theta e - 45°|/\sin|\theta f| = 1.$$

36. A light transmitting and receiving device according to claim 28, wherein said optical axis of projection and the optical axis of reception are perpendicular to each other.

37. A light transmitting and receiving device according to claim 28, wherein said optical member has an entrance surface on which the light beam from said light projecting unit is incident and a surface opposing the entrance surface, and wherein at least one of the entrance surface and the opposing surface is parallelogrammatic in shape.

38. A light transmitting and receiving device according to claim 37, wherein said optical member has an entrance surface on which the light beam from said light projecting unit is icident and a surface opposing the entrance surface, and wherein at least one of the entrance surface and the opposing surface is rhombic in shape.

39. A light transmitting and receiving device according to claim 38, wherein the transmission surface of said optical member is rectangular in shape.

40. A light transmitting and receiving device according to claim 38, wherein the transmission surface of said optical member is square in shape.

41. A light transmitting and receiving device according to claim 37, wherein the transmission surface of said optical member is rectangular in shape.

42. A light transmitting and receiving device according to claim 37, wherein the transmission surface of said optical member is square in shape.

43. A light transmitting and receiving device according to claim 28, wherein said optical member has a side surface in parallel with the plane in which both the optical axis of reception and the optical axis of projection lie, and wherein the side surface is parallelogrammatic in shape.

44. A light transmitting and receiving device according to claim 43, wherein the transmission surface of said optical member is rectangular in shape.

45. A light transmitting and receiving device according to claim 43, wherein the transmission surface of said optical member is square in shape.

46. A light transmitting and receiving device according to claim 28, wherein said optical member has a side surface in parallel with the plane in which both the optical axis of reception and the optical axis of projection lie, and wherein the side surface is rhombic in shape.

47. A light transmitting and receiving device according to claim 46, wherein the transmission surface of said optical member is rectangular in shape.

48. A light transmitting and receiving device according to claim 46, wherein the transmission surface of said optical member is square in shape.

* * * * *

UNITED STATES PATENT AND TRADEMARK OFFICE
CERTIFICATE OF CORRECTION

PATENT NO.   : 6,650,450 B1
DATED        : November 18, 2003
INVENTOR(S)  : Kanjo Orino et al.

It is certified that error appears in the above-identified patent and that said Letters Patent is hereby corrected as shown below:

Column 9,
Line 9, "ad" should read -- θd --.

Column 17,
Line 34, "i" should read -- i6 --.

Column 19,
Line 67, "the axis" should read -- the optical axis --.

Column 22,
Line 48, "31 1.1." should read -- 1.1 --.

Column 23,
Line 17, "icident" should read -- incident --.

Signed and Sealed this

Fifth Day of April, 2005

JON W. DUDAS
*Director of the United States Patent and Trademark Office*